United States Patent

Benjamins

(10) Patent No.: US 8,910,798 B2
(45) Date of Patent: Dec. 16, 2014

(54) APPARATUS AND METHOD FOR SORTING FLAT MATERIAL FROM WASTE MATERIAL

(75) Inventor: Jan Benjamins, Elim (NL)

(73) Assignee: Bollegraaf Patents and Brands B.V., Appingedam (NL)

( * ) Notice: Subject to any disclaimer, the term of this patent is extended or adjusted under 35 U.S.C. 154(b) by 58 days.

(21) Appl. No.: 12/903,549

(22) Filed: Oct. 13, 2010

(65) Prior Publication Data

US 2011/0084003 A1  Apr. 14, 2011

Related U.S. Application Data

(60) Provisional application No. 61/251,083, filed on Oct. 13, 2009.

(30) Foreign Application Priority Data

Oct. 13, 2009 (EP) .................................. 09172926

(51) Int. Cl.
*B07C 5/00* (2006.01)
*B07B 13/00* (2006.01)
*B29B 17/02* (2006.01)
*B29K 711/12* (2006.01)

(52) U.S. Cl.
CPC ........ *B07B 13/003* (2013.01); *B29B 2017/0241* (2013.01); *B29K 2711/12* (2013.01); *B29B 17/02* (2013.01); *Y10S 209/905* (2013.01); *Y10S 209/93* (2013.01)
USPC ............ 209/691; 209/643; 209/905; 209/930

(58) Field of Classification Search
USPC ........ 209/44.1, 616, 643, 905, 930, 691, 692; 414/676
See application file for complete search history.

(56) References Cited

U.S. PATENT DOCUMENTS

| | | | | |
|---|---|---|---|---|
| 3,770,112 A * | 11/1973 | Asfour | ........................ | 209/557 |
| 4,438,851 A | 3/1984 | Voelskow | | |
| 4,609,108 A * | 9/1986 | Hristozov et al. | ............ | 209/581 |
| 5,341,937 A * | 8/1994 | Vos | ................ | 209/38 |
| 5,632,381 A | 5/1997 | Thust et al. | | |
| 6,394,280 B1 * | 5/2002 | Gassner et al. | ............... | 209/616 |
| 2009/0194470 A1 * | 8/2009 | Hendrickson et al. | ........ | 209/691 |
| 2010/0059420 A1 | 3/2010 | Mills | | |

FOREIGN PATENT DOCUMENTS

| | | |
|---|---|---|
| DE | 9417627 U1 | 12/1994 |
| EP | 0050259 A2 | 4/1982 |
| EP | 1970130 A1 | 9/2008 |

(Continued)

*Primary Examiner* — Joseph C Rodriguez
*Assistant Examiner* — Kalyanavenkateshware Kumar
(74) *Attorney, Agent, or Firm* — Pearne & Gordon LLP

(57) ABSTRACT

A portion of a circulatable air permeable conveyor member (6) constitutes a sorting track (7) inclined from a lower end (8) to an upper end (9). A vacuum (11) is maintained underneath the sorting track (7). The sorting track (7) is arranged for entraining a portion of the material to be sorted with the conveyor member from a drop zone (15) of the sorting track (7) towards the upper end (9) of the sorting track (7) and allowing another portion of the material to be sorted to descend from the drop zone (15) towards the lower end (8) of the sorting track (7). A sweeper (2) is arranged between the drop zone (15) and the upper end (9) for sweeping flat material entrapping non-flat material off the entrapped non-flat material. A method for sorting flat material such as paper or plastic film from a stream of waste material is also disclosed.

17 Claims, 2 Drawing Sheets

(56) References Cited

FOREIGN PATENT DOCUMENTS

| | | |
|---|---|---|
| FR | 2329363 A1 | 5/1977 |
| GB | 2151949 A | 7/1985 |
| JP | 04267977 A | 9/1992 |
| WO | 2008059209 A1 | 5/2008 |

* cited by examiner

APPARATUS AND METHOD FOR SORTING FLAT MATERIAL FROM WASTE MATERIAL

FIELD AND BACKGROUND OF THE INVENTION

The invention relates to an apparatus for sorting lightweight, flat material such as paper sheets or plastic films. The invention also relates to a method for sorting lightweight, flat material such as paper sheets or plastic films.

From German Utility Model 94 17 627 a system and method for sorting lightweight, flat material such as paper sheets or plastic films are known in which a stream of material to be sorted is fed to an inclined sorting track constituted by a portion of a circulating, air permeable conveyor member under which a vacuum is generated and maintained. Under influence of the vacuum, flat material, such as paper and plastic film material, adheres to the conveyor member and are entrained from the drop zone to the upper end of the sorting track. Other material which is less susceptible to be held by suction through the air permeable belt, such as bottles, cans and other not generally flat material, does not adhere to the sorting track belt and descends to the lower end of the sorting track. Thus, flat material such as paper and plastic film material is sorted out of the stream of waste material.

Such a sorting step is of particular use in situations in which dry waste consisting mainly of paper, metal and plastic waste is collected in combination for efficient collection of waste. The flat material generally consists mainly of paper and the plastic film material can be sorted out of the paper in a separate sorting step, for instance employing an apparatus as disclosed in European patent application 1 970 130.

However, a problem of a sorting apparatus and method is that some non-flat material is nevertheless entrained to the upper end of the sorting track, in particular if waste is supplied at a high rate or irregularly so that high peak rates occur. This problem can to a large extent be avoided by avoiding high waste supply rates, but this entails a reduced sorting capacity.

SUMMARY OF THE INVENTION

It is an object of the present invention to reduce the amount of non-flat material in flat material sorted out of a stream of waste material, at least at higher waste supply rates.

According to the invention, this object is achieved by providing an apparatus for sorting flat material such as paper or plastic film from a stream of waste material, comprising:
a conveyor, comprising:
a circulatable air permeable conveyor member of which a portion constitutes a sorting track, extending and inclined from a lower end to an upper end;
means for maintaining a vacuum underneath the sorting track; and
a drive for driving the circulation of the conveyor member in a sense of transport;
wherein the sorting track is arranged for entraining a portion of the material to be sorted with the conveyor member from a drop zone of the sorting track towards the upper end of the sorting track and allowing another portion of the material to be sorted to descend from the drop zone towards the lower end of the sorting track; and
further comprising a sweeper between the drop zone and the upper end for sweeping flat material entrapping non-flat material off the entrapped non-flat material.

The invention can also be embodied in a method for sorting flat material such as paper sheets or plastic film from a stream of waste material, comprising:
feeding the stream of waste material to a drop zone of a sorting track constituted by a portion of a circulatable air permeable conveyor member, said portion extending and being inclined from a lower end to an upper end;
driving circulation of the conveyor member such that its portion constituting the sorting track moves from the lower end to the upper end;
generating and maintaining a vacuum underneath the inclined segment of the conveyor;
entraining a portion of the material to be sorted with the conveyor member from a drop zone of the sorting track towards the upper end of the sorting track and allowing another portion of the material to be sorted to descend from the drop zone towards the lower end of the sorting track;
the method further comprising sweeping flat material entrapping non-flat material off the entrapped non-flat material in a sweeping area between the drop zone and the upper end.

By sweeping flat material entrapping other material off the entrapped material, the entrapped material is released and descends along the sorting track under the influence of gravity. The flat material that has been swept off the entrapped material will generally also descend along the sorting track over some distance by sliding down over other material that has succeeded the swept off material, but is engaged by the suction caused by the vacuum maintained under the conveyor member once a sufficiently large uncovered surface portion of the sorting track is reached, so that it is again entrained by the circulating conveyor member to the upper end of the sorting track. Also relatively light non-flat objects that are held against the conveyor member without being entrapped are swept downward.

Thus the formation of heaps of material on the sorting track has much less effect on the amount of non-flat material that ends up in the sorted flat material, so the sorting process is much less sensitive to a prolonged or temporary high supply rate of the waste material to be sorted. Accordingly, a higher capacity can be reached with a sorting track of given dimensions without adversely affecting the selectivity of the sorting process.

Particular embodiments of the invention are set forth in the dependent claims. Further objects, features, effects and details of the invention are described below.

DETAILED DESCRIPTION

Figure 1:
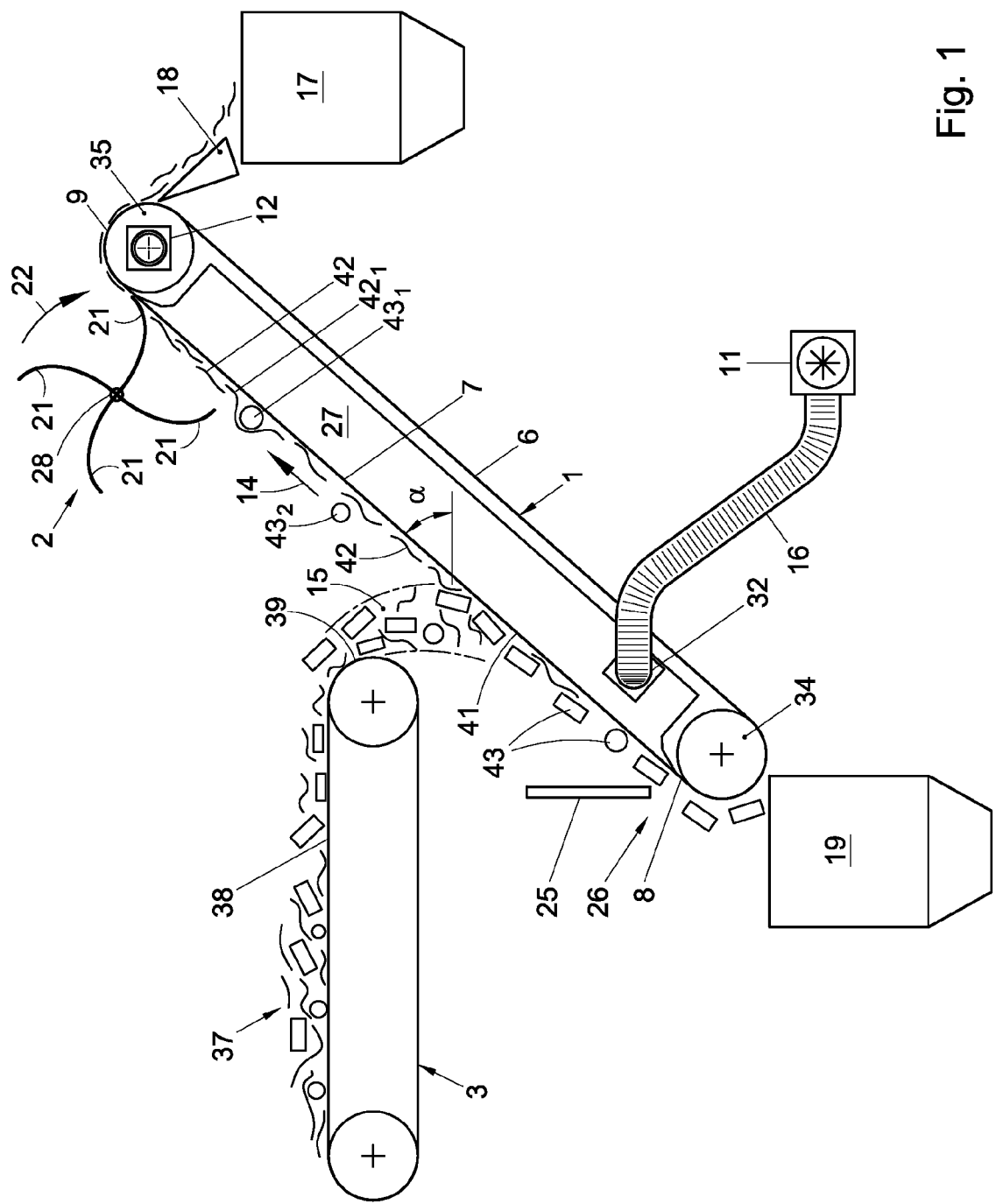
FIG. 1 is a schematic side view of an example of an apparatus according to the invention, with material being processed.
Figure 2:
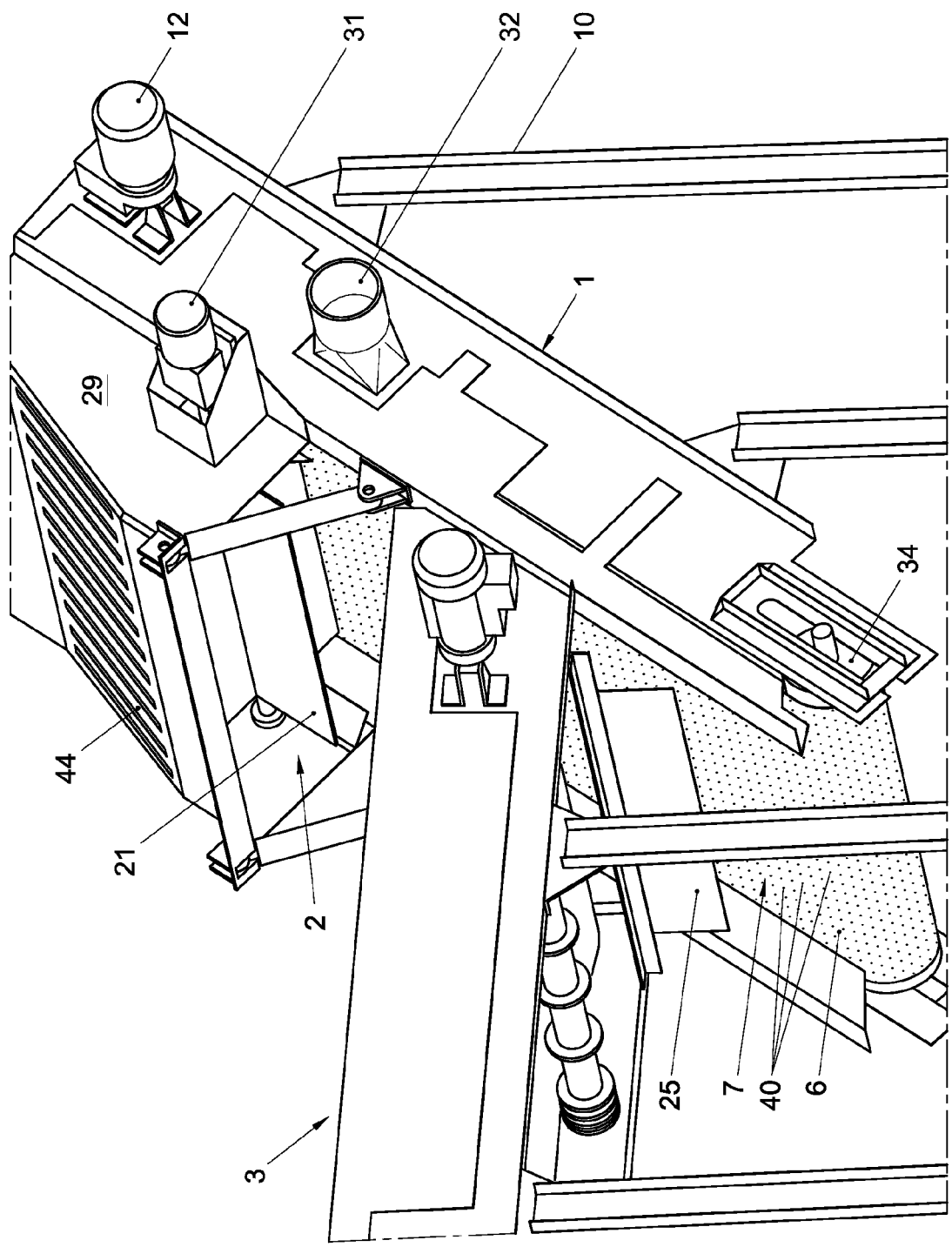
FIG. 2 is a more detailed perspective view of a portion of the apparatus shown in FIG. 1, without material being processed.

First, the construction of the example shown in FIGS. 1 and 2 of an apparatus according to the invention for sorting flat material such as paper sheets or plastic films from a stream of waste material is described.

The apparatus has a transport conveyor 1 with a circulatable conveyor member 6 which is arranged such that a section 7 of the conveyor member 6 constitutes a conveyor track 7. The conveyor 1 is supported by a frame structure 10 (FIG. 2) so that the sorting track 7 extends and is inclined from a lower end 8 to an upper end 9 at an angle of inclination $\alpha$ (FIG. 1). The angle of inclination $\alpha$ is preferably larger than 45° and more preferably larger than 48°-50°. An angle of inclination α of 50°-54° has been found particularly suitable for processing dry waste material from households and the like.

The conveyor member 6 is tensioned about rollers 34, 35. One of the rollers 35 is coupled to a motor 12 for driving circulation of the conveyor member 6 such that the portions of the conveyor member 6 constituting the bottom of the sorting track 7 move in a direction of transport 14 from the lower end 8 to the upper end 9 of the sorting track 7.

For feeding waste material to be sorted 37 to the sorting track 7, a feeding conveyor 3 is provided which defines a feeding path 38 over which the waste material to be sorted 37 can be fed. A downstream end 39 of the feeding path 38 is located above the sorting track 7 and defines a drop zone 15 in which, in operation, the material to be sorted 37 is dropped onto the sorting track 7.

The conveyor member 6 is air permeable. In this example, the air permeable conveyor member 6 is a perforated endless belt. The perforations 40 (of which only a few are designated by reference numerals) allow air to pass through the belt 6. A fan 11 is provided for maintaining a vacuum underneath the sorting track 7. The fan 11 communicates with a generally airtight vacuum chamber 27 (FIG. 1) under the sorting track 7 via an air hose 15 connected to an orifice 32. The chamber 27 has one obliquely upwardly facing side 41 bounded by most of the section of the conveyor belt 6 constituting the bottom of the sorting track 7, so the chamber 27 is in communication with the environment via the perforations 40 in the sorting conveyor 6. If the fan 11 is active for pumping air out of the vacuum chamber 27, air streams through the perforations 40 in the bottom of the conveyor track 7 and suction is generated that selectively holds flat items 42 from the stream of waste material 37 against the sorting track 7 while being too weak for holding at least a substantial portion of the non-flat items 43 from the stream of waste material 37 against the sorting track 7.

The non-flat items 43 are items having a smallest third dimension which is larger than the smallest third dimension of the flat items, the latter being typically thinner than 3 cm and in most applications also thinner than 1.5 cm. Another difference between the flat items 42 and the non-flat items 43 is that the flat items 42, when lying on the sorting track 7, have a plane surface in contact with the sorting track 7. This causes the suction through the sorting track 7 to be effective for pulling the flat items 42 against the sorting track 7 over a relatively large surface and thus with a relatively large force. At least some of the flat items 7 entrained towards the upper end 9 of the sorting track 7 may even be of a larger weight than most of the non-flat items 43 that roll and slide towards the lower end 8 of the sorting track 7.

As is illustrated in FIG. 1, most of the flat items 42 (of which only a few are designated by a reference numeral) in the waste material 37 are engaged by the circulating conveyor belt 6 and transported upwardly from the drop zone 15, some of the flat items 42 may initially slide downwardly over some distance until being engaged by a portion of the sorting track 7 not covered by other material and then be transported upwardly towards the upper end 9 of the sorting track 7 and discharged into a flat item collecting bin 17.

Since at least most of the non-flat items 43 (of which only a few are designated by a reference numeral) are not engaged by the circulating conveyor belt 6, at least most of the non-flat items 43 roll and slide from the drop zone 15 towards the lower end 8 of the sorting track 7 and drop into a non-flat item collecting bin 19.

An at least partially flexible sweeper 2 is located above the sorting track 7 in a position along the sorting track 7 between the drop zone 15 and the upper end 9 of the sorting track 7.

The sweeper 2 is arranged for sweeping flat material 42 entrapping other material 43 off the entrapped other material 43. As is illustrated in FIG. 1, sometimes a non-flat item $43_1$ becomes entrapped under one or more flat items $42_1$ so that the non-flat item $43_1$ does not descend towards the lower end 8, but is initially retained against the sorting track 7 and entrained by the conveyor belt 6 towards the upper end 9 of the sorting track 7. This occurs in particular when waste material 37 is supplied to the sorting track 7 at a relatively high average or peak rate.

When such entrapped non-flat items $43_1$ reach the sweeper 2, the flat item or flat items $42_1$, which generally project from the sorting track 7 relatively far and generally adhere against the sorting track 7 with a relatively small force because the entrapping flat item or items $42_1$ lie less flatly against the sorting track 7 than other flat items 42, are swept off the non-flat item or items $43_1$ so that these non-flat items $43_1$ are released and roll or slide down the sorting track 7 towards its lower end 8 as is illustrated by non-flat item $43_2$. The flat item or items $42_1$ that have been swept off the entrapped non-flat item or items $43_1$ may also slide down along the sorting track 7 over some distance until being engaged by a portion of the sorting track 7 not covered by other material but are then being transported upwardly towards the upper end 9 of the sorting track 7 and discharged into the flat item collecting bin 17. Although a descending non-flat item $43_2$ may become entrapped again when passing the drop zone 15, when the supply rate of the waste material 37 is chosen suitably, most entrapped non-flat items will not be entrapped again. However, repeated sweeping at the sweeper is advantageous for causing material clinging together to be separated so that the non-flat items thereof can be separated from the flat items thereof.

The portion of the conveyor belt beyond the upper end 9 of the sorting track 7 is not in communication with the vacuum chamber 27, so material is not adhered against the conveyor 6 anymore after it has passed beyond the upper end 9 of the sorting track 7. However, some flat items 42 may still keep clinging to the conveyor belt 6, for instance due to humidity or sticky substances on the conveyor belt 6 and/or on the flat items 42. To reliably remove flat items off the conveyor, a scraper 18 is arranged downstream, in the sense of movement of the conveyor belt 6, of the sweeper 2, for scraping off material of the surface of the conveyor belt 6. The scraper 18 is shaped such that the material scraped off is guided to the flat material collecting bin 19.

In the present example, the sweeper 2 is provided in the form of a rotor 2 having radially projecting flexible sweeping members 21. The rotor 2 is suspended rotatably about a rotation axis 28 transverse to and above the sorting track 7. A drive 31 (see FIG. 2) is coupled to the rotor 2 for driving rotation of the rotor 2 about the rotation axis 28 in a sense of rotation 22 such that, on the side of the rotor 2 nearest to the sorting track 7, the sweeping member 21 oriented towards the sorting track 7 moves with a directional component opposite to the direction of transport 14. This movement of the outer ends of the sweeping members 21 relative to the sorting track 7 causes the flat material 42 to be swept very reliably off any non-flat material 43 entrapped thereby and reduces the risk of flat items and entrapped items slipping by the sweeper 2.

The sweeping members can be provided in many forms, such as in the form of brushing fibres. In the present example the sweeping members are flexible blades 21 extending in a plane parallel to the rotation axis 28. The flexible blades 21 effectively engage any material projecting relatively far from the sorting track 7 while accommodating to variations in thickness of the material between the sweeper 2 and the sorting track 7 as well. It can also be provided that only a distal end portion of one or each of the sweeping blades is flexible.

By providing that at least an outer end portion of each sweeping member 21 is of rubber material, a relatively high friction relative to the flat items is achieved in combination with flexibility. The high friction relative to flat items is advantageous to achieve that flat items entrapping non flat items are effectively displaced at a relatively low contact pressure.

As is best seen in FIG. 1, the sweeping members 21 are of such a length that, in absence of material between the sweeping member 21 and the sorting track 7, rotation of the rotor 2 causes an outer end portion of each sweeping member 21 to contact with and to be deflected by the sorting track 7 in a portion of its path of rotation. Thus, even flat items entrapping relatively small non-flat items are reliably swept off the underlying items.

The rotor 2 is rotatably suspended to a frame 29 so as to be movable towards and away from the sorting track 7 between a position in contact with the sorting track 7 and a position urged away from the sorting track 7 so that the distance of the axis of rotation of the rotor 2 can accommodate to variation in thickness of the layer of items passing underneath the rotor 2. Moreover, when accumulated material or material that is too large, such as a cardboard box, blocks or obstruct the blades 21 of the rotor 2, the rotor 2 can be moved to a cleared position, allowing an operator to remove the blocking material.

A passage bounded by the sorting track 7 and a lower end of a grader 25 is located between the drop zone 15 and the lower end 8 of the sorting track 7. The grader 25 limits the maximum thickness of the layer or pile-up of material that can descend along and off the sorting track 7. If the layer or pile-up is too thick, the risk increases that flat items 42 descend off the sorting track 7 while staying out of reach and/or shielded from the suction applied via the conveyor belt 6. In the event of a temporarily too thick layer or pile-up of material descending along the sorting track 7, the part of the layer or pile-up beyond the lower end of the grader 25 abuts against the grader 25 and stays there until material lower in the layer or pile-up has passed underneath the grader 25 and/or has been entrained upwardly along the transport track 7 so that the material has lowered far enough to pass underneath the grader or to be entrained by the conveyor belt as well. If the lower end of the grader 25 is positioned low enough, the rate at which flat material passes underneath the grader 25 will be small enough to ensure that the flat material reaches a sufficiently large uncovered area of the sorting track 7 to be engaged by the applied vacuum and entrained upwardly before reaching the lower end 8 of the sorting track 7. Furthermore the limited height above the sorting track 7 at the grader 25 causes items clinging together to be separated more easily, so that flat and not-flat items are sorted individually.

The position of the grader 25 is adjustable to set the height of the lower edge of the grader 25 to a level suitable for the characteristics of the waste being processed and other processing parameters such a speed of the conveyor belt 6, steepness of the sorting track 7 and the length of the portion of the sorting track 7 downhill of the grader 25.

It is observed that a grader 25 mounted such that a passage bounded by the sorting track 7 and the lower end of the grader 25 is located between the drop zone and the lower end 8 of the sorting track 7 and other disclosed features of the grader can also be applied in an advantageous manner if the sorting apparatus is not equipped with a sweeper. However, the provision of such a grader is of particular advantage in a sorting apparatus equipped with a sweeper. While the presence of such a sweeper allows to feed waste to be sorted at a relatively high rate with relatively little risk of entraining non-flat items entrapped between flat items, such a high feeding rate also entails an increased risk of flat items descending on top of non-flat items, which risk is reduced by the limiting effect on the layer and pile-up thickness afforded by the grader.

As is shown in FIG. 2, the sweeper 2 is covered by a hood 44 for preventing material scooped by blades 21 from being thrown into the air and soiling the environment of the apparatus.

While the invention has been illustrated and described in detail in the drawing and foregoing description, such illustration and description are to be considered illustrative or exemplary and not restrictive; the invention is not limited to the disclosed embodiments. For example, the conveyor can be of a different air permeable construction, such as composed of links of steel or plastic or a braided or woven structure. Furthermore, the sweeper may be stationary or moving in another pattern than circulating about an axis of rotation extending transversely above the sorting track. Movement of the sweeper may for instance be translational or rotational about an axis extending obliquely to the sorting track and/or intersecting the sorting track. Sweeping in a direction with a directional component perpendicular to the direction of transport can be advantageous for moving flat items sideways where a surface portion of the sorting track may be reached earlier, for instance if the waste is deposited onto the sorting track mainly in a central part of the sorting track and, to a lesser extent, to the sides of the sorting track. Also, two or more sweepers may be placed in series behind each other, wherein e.g. a next one of the sweepers may be arranged for applying more pressure than the first sweeper. Furthermore, instead of by the upwardly facing section of a belt conveyor, the feeding path can for instance be constituted by a chute or an inclined gutter through which material to be sorted slides to the sorting track. These and other variations to the disclosed embodiments can be understood and effected by those skilled in the art in practicing the invention set forth in the claims, from a study of the drawings, the disclosure, and the appended claims.

What is claimed is:

1. An apparatus for sorting flat material such as paper or plastic film from a stream of waste material, comprising:
   a conveyor, comprising:
      a circulatable air permeable conveyor member of which a portion constitutes an air permeable sorting track, extending and inclined from a lower end to an upper end;
      means for maintaining a vacuum underneath the sorting track and effective for causing suction through the air permeable sorting track;
      a supply track arranged for dropping supplied material to be sorted to a drop zone of the sorting track, the drop zone being located between the upper and lower ends of the sorting track; and
      a drive for driving the circulation of the conveyor member for transporting in a sense of transport from the lower end to the upper end;
   wherein permeability and inclination of the sorting track and the means for maintaining a vacuum underneath the sorting track are arranged for and are effective for causing a first portion of the material to be sorted to be entrained with the conveyor member from the drop zone in a first direction of travel inclined upwardly towards the upper end of the sorting track and causing a second portion of the material to be sorted to descend from the drop zone towards the lower end of the sorting track, said first portion of the material including said flat material, said second portion of the material including material which is less susceptible to being held by said suction through the air permeable sorting track; and further comprising a sweeper between the drop zone and the upper end effective for sweeping, in a direction against the first direction of travel, flat material entrapping non-flat material off the entrapped non-flat material.

2. An apparatus according to claim 1, wherein the sweeper is a rotor comprising at least one radially projecting flexible sweeping member, the rotor being suspended rotatably about a rotation axis transverse to the sorting track, the apparatus further comprising a drive for driving rotation of the rotor about the rotation axis in a sense of rotation such that, on the side of the rotor nearest to the sorting track, the sweeping member oriented towards the sorting track moves with a directional component opposite to the direction of transport.

3. An apparatus according to claim 2, wherein the at least one sweeping member includes at least one blade extending in a plane parallel to the rotation axis, of which blade at least a distal end portion is flexible.

4. An apparatus according to claim 2, wherein at least an outer surface of at least an outer end portion of the at least one sweeping member is of rubber material.

5. An apparatus according to claim 2, wherein the at least one sweeping member is of such a length that, in absence of material between the at least one sweeping member and the sorting track, rotation of the rotor causes an outer end portion of the at least one sweeping member to contact with and to be deflected by the sorting track in a portion of its path of rotation.

6. An apparatus according to claim 1, wherein the sweeper is suspended so as to be movable towards and away from the sorting track between a position in contact with the sorting track and a position urged away from the sorting track.

7. An apparatus according to claim 1, wherein the supply track has a downstream end above the drop zone.

8. An apparatus according to claim 1, further comprising:
a first discharge site adjacent to the upper end of the sorting track for receiving discharged flat material entrained by the conveyor member along the sorting track; and
a second discharge site located adjacent to the lower end of the sorting track for receiving from the sorting track discharged non-flat material descended along at least a lower portion of the sorting track.

9. An apparatus according to claim 1, wherein the air permeable conveyor member comprises a perforated endless belt.

10. An apparatus according to claim 1, further comprising a scraper downstream, in the sense of movement of the conveyor member, of the sweeper, the scraper being arranged for scraping off material from the surface of the conveyor member.

11. An apparatus for sorting flat material such as paper or plastic film from a stream of waste material, comprising:
a conveyor, comprising:
a circulatable air permeable conveyor member of which a portion constitutes an air permeable sorting track, extending and inclined from a lower end to an upper end;
means for maintaining a vacuum underneath the sorting track and effective for causing suction through the air permeable sorting track;
a supply track arranged for dropping supplied material to be sorted to a drop zone of the sorting track, the drop zone being located between the upper and lower ends of the sorting track; and
a drive for driving the circulation of the conveyor member for transporting in a sense of transport from the lower end to the upper end;
wherein the sorting track is oriented at an angle of inclination to a horizontal plane of at least 50° and wherein permeability of the sorting track and the means for maintaining a vacuum underneath the sorting track are arranged for and are effective for causing a first portion of the material to be sorted to be entrained with the conveyor member from the drop zone in a first direction of travel inclined upwardly towards the upper end of the sorting track and causing a second portion of the material to be sorted to descend from the drop zone towards the lower end of the sorting track, said first portion of the material including said flat material, said second portion of the material including material which is less susceptible to being held by said suction through the air permeable sorting track; and
further comprising a sweeper between the drop zone and the upper end effective for sweeping, in a direction against the first direction of travel, flat material entrapping non-flat material off the entrapped non-flat material.

12. An apparatus according to claim 1, further comprising a grader, a passage bounded by the sorting track and a lower end of the grader being located between the drop zone and the lower end of the sorting track.

13. A method for sorting flat material such as paper sheets or plastic film from a stream of waste material, comprising:
feeding the stream of waste material to a drop zone of an air permeable sorting track which is a portion of a circulatable air permeable conveyor member, said sorting track extending and being inclined from a lower end to an upper end;
driving circulation of the conveyor member such that the sorting track moves from the lower end to the upper end;
generating and maintaining a vacuum underneath an inclined segment of the conveyor member effective for causing suction through the air permeable sorting track;
entraining a first portion of the material to be sorted with the conveyor member from the drop zone of the sorting track in a first direction of travel inclined upwardly towards the upper end of the sorting track and allowing a second portion of the material to be sorted to descend from the drop zone towards the lower end of the sorting track, said first portion of the material including said flat material, said second portion of the material including material which is less susceptible to being held by said suction through the air permeable sorting track, the drop zone being located between the upper and lower ends of the sorting track;
the method further comprising sweeping, in a direction against the first direction of travel, flat material entrapping non-flat material off the entrapped non-flat material in a sweeping area between the drop zone and the upper end.

14. A method according to claim 13, wherein the sweeping is carried out by rotating a sweeper about an axis transverse to and above the sorting track.

15. A method according to claim 13, further comprising limiting a flow of material descending from the drop zone to a maximum thickness above the sorting track.

16. An apparatus according to claim 1, wherein the means for maintaining a vacuum communicate with a generally airtight vacuum chamber under the sorting track, said chamber having one obliquely upwardly facing side bounded by a bottom of the air permeable sorting track for letting the chamber communicate with the environment via the sorting track.

17. An apparatus according to claim 12, the grader being located in a position which is adjustable.

* * * * *